US012641185B2

(12) United States Patent
Aoki

(10) Patent No.: US 12,641,185 B2
(45) Date of Patent: May 26, 2026

(54) IMAGE MANAGEMENT APPARATUS, METHOD OF CONTROLLING IMAGE MANAGEMENT APPARATUS, AND STORAGE MEDIUM

(71) Applicant: CANON KABUSHIKI KAISHA, Tokyo (JP)

(72) Inventor: Yosuke Aoki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/816,664

(22) Filed: Aug. 27, 2024

(65) Prior Publication Data

US 2025/0080679 A1 Mar. 6, 2025

(30) Foreign Application Priority Data

Sep. 1, 2023 (JP) ................................. 2023-142031

(51) Int. Cl.
*H04N 1/32* (2006.01)
*H04N 1/00* (2006.01)

(52) U.S. Cl.
CPC ..... *H04N 1/32641* (2013.01); *H04N 1/00344* (2013.01); *H04N 1/32614* (2013.01); *H04N 2201/0084* (2013.01)

(58) Field of Classification Search
CPC ........... H04N 1/32641; H04N 1/00344; H04N 1/32614; H04N 2201/0084; H04N 1/00214; H04N 1/00095; H04N 1/00114;

G06F 3/1207; G06F 3/121; G06F 3/1234; G06F 3/1236; G06F 3/1259; G06F 3/1285; G06F 3/1294; G06F 3/1204
See application file for complete search history.

(56) References Cited

U.S. PATENT DOCUMENTS

| | | | | |
|---|---|---|---|---|
| 6,806,975 B1 * | 10/2004 | Fujita | ................. | H04N 1/32657 |
| | | | | 358/1.14 |
| 2003/0112464 A1 * | 6/2003 | Garcia | .................. | G06F 3/1288 |
| | | | | 358/1.15 |
| 2011/0002000 A1 * | 1/2011 | Tomaru | ................. | G06F 11/079 |
| | | | | 358/1.14 |
| 2014/0049791 A1 * | 2/2014 | Nakamura | .............. | H04L 67/02 |
| | | | | 358/1.13 |

FOREIGN PATENT DOCUMENTS

| | | | |
|---|---|---|---|
| JP | 2002196916 A | * | 7/2002 |
| JP | 2022109916 A | | 7/2022 |

* cited by examiner

*Primary Examiner* — Michael E Teitelbaum

(74) *Attorney, Agent, or Firm* — Canon U.S.A., Inc. IP Division

(57) ABSTRACT

An image management apparatus for managing an image includes a transmission unit configured to transmit an image analysis request to an image analysis apparatus for analyzing the image, a reception unit configured to receive an analysis result, including a result code, from the image analysis apparatus, a processing result determination unit configured to determine a processing result based on the result code, and a subsequent process determination unit configured to determine a subsequent process related to analysis of the image based on the processing result.

11 Claims, 9 Drawing Sheets

FIG.4

| RESULT CODE | PROCESSING RESULT | FAILURE CAUSE | FAILURE CAUSE CATEGORY |
|---|---|---|---|
| 401 | 402 | 403 | 404 |
| A01-001 | NORMAL END | — | — |
| A02-001 | ABNORMAL END | NO REQUIRED PARAMETERS | SENDER-RELATED CAUSE |
| A02-002 | ABNORMAL END | INCORRECT REQUEST HEADER | SENDER-RELATED CAUSE |
| A02-003 | ABNORMAL END | INCORRECT PARAMETER TYPE | SENDER-RELATED CAUSE |
| A02-004 | ABNORMAL END | FAILURE TO AUTHENTICATE PARAMETERS | SENDER-RELATED CAUSE |
| A02-005 | ABNORMAL END | INVALID PARAMETERS | SENDER-RELATED CAUSE |
| A02-006 | ABNORMAL END | FAILURE TO DOWNLOAD IMAGE | RECEIVER-RELATED CAUSE |
| A02-007 | ABNORMAL END | FAILURE TO UPLOAD RESULTS | RECEIVER-RELATED CAUSE |
| A02-008 | ABNORMAL END | SERVER ERROR | RECEIVER-RELATED CAUSE |
| A02-009 | ABNORMAL END | UNSECURE COMMUNICATION SETTINGS | SENDER-RELATED CAUSE |
| A02-010 | ABNORMAL END | NOT REQUEST USING A SPECIFIED METHOD | SENDER-RELATED CAUSE |
| A02-011 | ABNORMAL END | TIMEOUT ERROR | COMMUNICATION PATH-RELATED CAUSE |

FIG.6

| IMAGE ID<br>601 | USER ID<br>602 | IMAGE STORAGE<br>LOCATION<br>603 | IMAGE ANALYSIS<br>START TIME<br>604 |
|---|---|---|---|
| 001 | AAA | content/images/AAA/001.jpg | 2023/07/01 12:30:00 |
| 002 | AAA | content/images/AAA/002.jpg | 2023/07/02 13:00:00 |
| 003 | BBB | content/images/BBB/003.jpg | 2023/07/03 09:13:60 |
| 004 | CCC | content/images/CCC/004.jpg | 2023/07/03 22:32:50 |

FIG.7A

SYNCHRONOUS RESPONSE (SUCCESSFUL)

```
{
    "JOB ID" : "J001",
    "RESULT CODE" : "A01-001"
}
```

FIG.7B

SYNCHRONOUS RESPONSE (FAILED)

```
{
    "JOB ID" : "J002",
    "RESULT CODE" : "A02-011"
}
```

FIG.7C

ASYNCHRONOUS RESPONSE (SUCCESSFUL)

```
{
    "JOB ID" : "J001",
    "RESULT CODE" : "A01-001",
    "ANALYSIS RESULTS": {
        "TAG" : [
            {
                "TAG" : "HUMAN",
                "RELIABILITY": "0.9"
            },
            {
                "TAG" : "COMPUTER"
                "RELIABILITY" : "0.5"
            }
        ]
    }
}
```

FIG.7D

ASYNCHRONOUS RESPONSE (FAILED)

```
{
    "JOB ID" : "J002",
    "RESULT CODE" : "A02-011"
}
```

FIG.8

| JOB ID | IMAGE ID | PROCESSING COUNT |
|--------|----------|------------------|
| J001 | 001 | 1 |
| J003 | 002 | 2 |
| J004 | 002 | 3 |
| J005 | 002 | 4 |

*801*  *802*  *803*

IMAGE MANAGEMENT APPARATUS, METHOD OF CONTROLLING IMAGE MANAGEMENT APPARATUS, AND STORAGE MEDIUM

BACKGROUND OF THE INVENTION

Field of the Invention

The present invention relates to an image management apparatus that manages images transferred from an imaging apparatus, an image analysis apparatus that analyzes images, a determination and control method for determining a subsequent process based on a result of an analysis process, and a computer program.

Description of the Related Art

As a development method of software systems, there is a development method called "microservice architecture" by which the functions of an application are divided into small "services" and the services are collaborated to operate the system. The services operated by respective independent processes collaborate through remote communication using a lightweight mechanism such as RESTful Application Programming Interface (API). For example, even if a failure occurs in a certain service, the effect of the failure can be suppressed locally, which brings about an advantage that the fault tolerance of the entire application is improved.

In recent years, applications that adopt this microservice architecture have increasingly become popular. For example, in image management services that manage images, there is an application configured such that its functions, such as an image analysis function and an image transfer function of transferring images to external storage or social networking service (SNS), are provided independently as separate services.

In an application configured with a microservice architecture as described above, a service communicates with another service via, for example, a RESTful API to make a call. A call between services may fail for various reasons, such as a setting error on the caller side, a network error, or a failure in the called service. If a call to a service fails, the functions of the application cannot be provided, causing inconvenience to users. For this reason, it is desirable to prevent a failure of a call between services as much as possible.

Japanese Patent Application Laid-Open No. 2022-109916 discusses a technique for increasing the possibility of obtaining a printed material while reducing the burden on a user in a printing system having a plurality of processing paths between a printer and an information processing apparatus. If processing on the first processing path fails, the system switches to the second processing path and retries printing, thereby reducing the number of printing failures.

However, according to the technique discussed in Japanese Patent Application Laid-Open No. 2022-109916, a retry process is executed each time a process failure occurs, regardless of the content of the process failure. Depending on the cause of the failure, there may be cases where the retry process always fails again.

SUMMARY OF THE INVENTION

The present invention has been made in view of the above-described problems and is directed to reducing failures in retrying an analysis request in an image management apparatus that communicates with an image analysis apparatus.

According to an aspect of the present invention, an image management apparatus for managing an image includes a transmission unit configured to transmit an image analysis request to an image analysis apparatus for analyzing the image, a reception unit configured to receive an analysis result, including a result code, from the image analysis apparatus, a processing result determination unit configured to determine a processing result based on the result code, and a subsequent process determination unit configured to determine a subsequent process related to analysis of the image based on the processing result.

Further features of the present invention will become apparent from the following description of embodiments with reference to the attached drawings.

BRIEF DESCRIPTION OF THE DRAWINGS

FIG. 4 is a diagram illustrating an example of result codes and information associated with the result codes.

FIG. 6 is a diagram illustrating an example of information stored in an analysis image management unit.

FIGS. 7A to 7D illustrate examples of response information from the image analysis apparatus.

FIG. 8 is a diagram illustrating an example of information stored in a job management unit.

DESCRIPTION OF THE EMBODIMENTS

Figure 1:
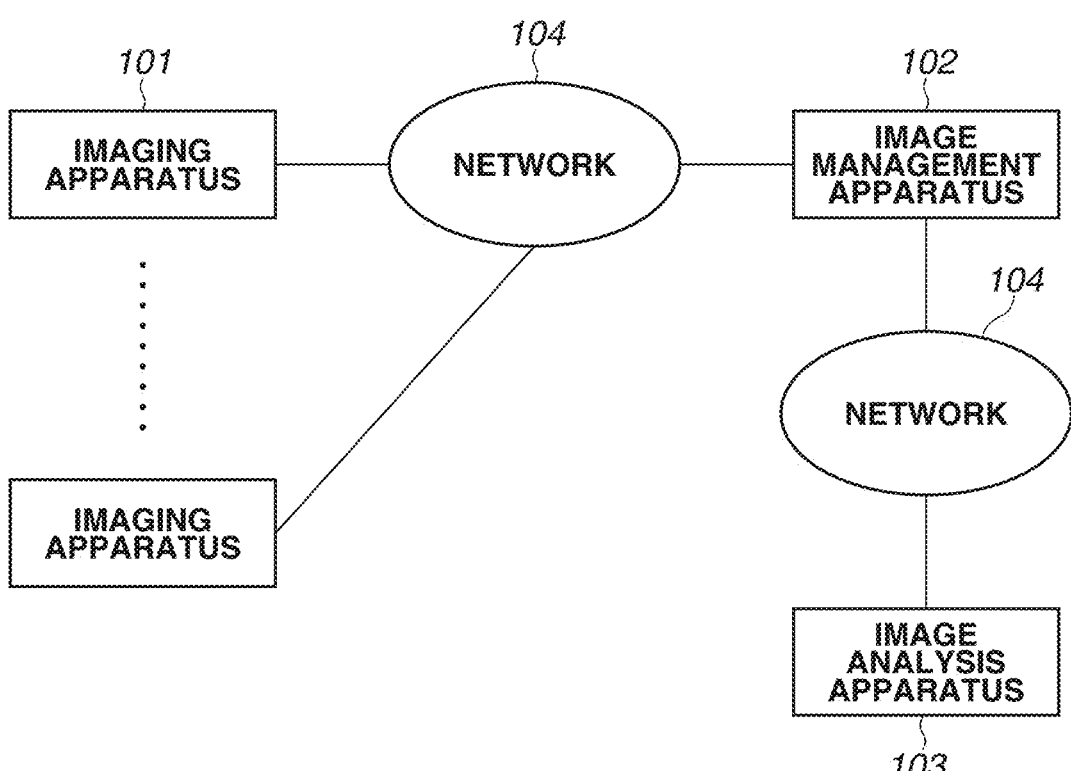
FIG. 1 is a diagram illustrating an overall configuration.

Hereinafter, an embodiment will be described in detail with reference to the accompanying drawings. The configuration described in the following embodiment is merely an example, and the present invention is not limited to the configuration illustrated in the drawings.

In the present embodiment described below, an example is described in which an image management apparatus that manages an image uploaded from an imaging apparatus communicates with an image analysis apparatus that performs an analysis process on the image and determines a subsequent process based on a result code received along with a result of the analysis process.

Overall Configuration

An overall configuration according to the present embodiment will be described with reference to FIG. 1.

As illustrated in FIG. 1, the overall configuration includes at least one imaging apparatus 101, an image management apparatus 102, and an image analysis apparatus 103. The components are connected via a network 104.

The imaging apparatus 101 is an information processing apparatus, such as a camera, a mobile phone, a smartphone, or a tablet.

The image management apparatus 102 manages an image transferred from the imaging apparatus 101.

When a processing request is made for image analysis on an image managed by the image management apparatus 102, the image analysis apparatus 103 accepts the processing request for image analysis and executes an image analysis process. After completion of the image analysis process, the image analysis apparatus 103 returns a result of the analysis to the image management apparatus 102.

The above is the overall configuration of the present embodiment.

Hardware Configuration

A hardware configuration of the image management apparatus 102 according to the present embodiment will be described with reference to FIG. 2.

Figure 2:
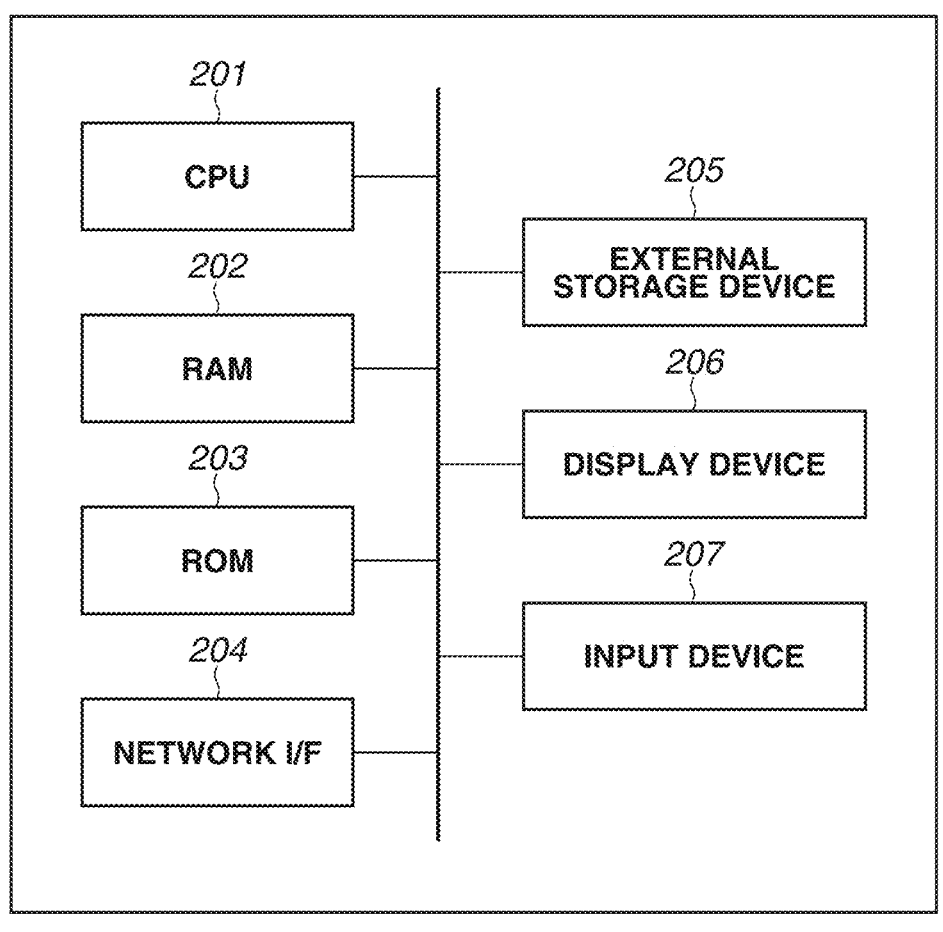
FIG. 2 is a diagram illustrating a hardware configuration of an image management apparatus.

As illustrated in FIG. 2, the image management apparatus 102 includes at least a central processing unit (CPU) 201, a random access memory (RAM) 202, a read only memory (ROM) 203, a network interface 204, an external storage device 205, a display device 206, and an input device 207.

The CPU 201 controls the operations of the units constituting the image management apparatus 102 and serves as the main component that executes various processes (described below) as processes to be performed by the image management apparatus 102.

The RAM 202 is a memory that temporarily stores data and control information, and serves as a work area to be used by the CPU 201 when various processes are executed.

The ROM 203 stores fixed operation setting values, operation programs, and any other similar data of the image management apparatus 102.

The network interface 204 provides a function for connecting to a network to perform communication. The network interface 204 allows the image management apparatus 102 to transmit and receive data to and from an external apparatus.

The external storage device 205 is a device for storing data, and has an interface for receiving input/output (I/O) commands for reading and writing data. The external storage device 205 may be, for example, a hard disk drive (HDD), a solid state drive (SSD), an optical disk drive, a semiconductor storage device, or another type of a storage device. The external storage device 205 stores computer programs and data for causing the CPU 201 to execute processes (described below) as process to be performed by the image management apparatus 102.

The display device 206 is a liquid crystal display (LCD), for example, and displays various information to the user.

The input device 207 is a keyboard, a mouse or a touch panel, for example, and receives an input from the user.

Functional Configuration

Figure 3:
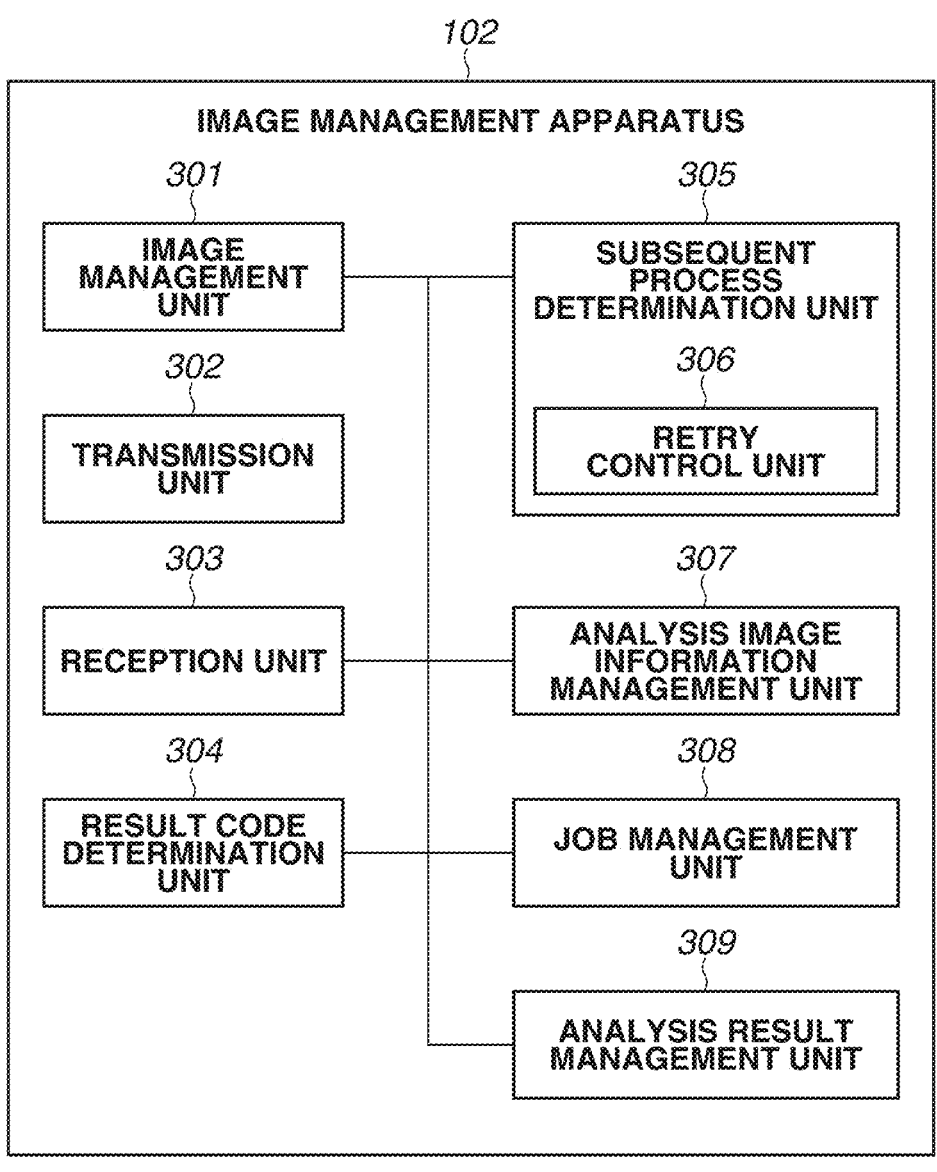
FIG. 3 is a diagram illustrating a functional configuration of the image management apparatus.

A configuration of the image management apparatus 102 according to the present embodiment will be described with reference to FIG. 3.

The image management apparatus 102 in the present embodiment has an image management unit 301, a transmission unit 302, a reception unit 303, a result code determination unit 304, a subsequent process determination unit 305, a retry control unit 306, an analysis image information management unit 307, a job management unit 308, and an analysis result management unit 309.

The image management unit 301 stores images. The images transferred from the imaging apparatus 101 are managed by the image management unit 301.

The transmission unit 302 transmits, to the image analysis apparatus 103, a processing request for analyzing an image managed by the image management unit 301.

The reception unit 303 receives a result of an image analysis process from the image management apparatus 102.

The result code determination unit 304 determines whether the process has ended normally or abnormally by referring to a result code included in the result of the image analysis process received by the reception unit 303. If the process has ended abnormally, the result code determination unit 304 further determines a cause category.

The subsequent process determination unit 305 determines a subsequent process based on the result of the determination by the result code determination unit 304.

The retry control unit 306 in the subsequent process determination unit 305 determines whether to make a retry, depending on the cause category. The retry control unit 306 also determines whether the upper limit of retries set in the system has been reached.

The analysis image information management unit 307 manages information on an image to be analyzed when an image analysis request is made to the image analysis apparatus 103.

The job management unit 308 manages an association between an image to be analyzed and an analysis process to be executed when an image analysis request is made to the image analysis apparatus 103. In the present embodiment, an analysis process to be executed on one image is called a "job", and a job identification (ID) that uniquely identifies the job is assigned each time an analysis process is executed.

The analysis result management unit 309 manages analysis results received from the image analysis apparatus 103.

Next, result codes and information associated with the result codes in the present embodiment will be described with reference to FIG. 4. A result code is an identification code, such as A01-002, and is associated with a cause of failure and a category of a cause of failure.

A result code 401 is included in the analysis result received from the image analysis apparatus 103.

Processing result 402 indicates a result of an image analysis process and takes the value of either "normal end" or "abnormal end".

A failure cause 403 indicates a failure cause in the image analysis process and also indicates the content of the failure cause. If the processing result indicates "normal end", this item has no value.

A failure cause category 404 indicates a cause category for classifying failure causes and takes one of the values "sender-related cause," "receiver-related cause", and "communication path-related cause".

The sender-related cause among the failure cause categories indicates a cause of a failure resulting from the sender side, and sender-related failure causes include "no required parameters", "incorrect (invalid) request header", "not valid parameters", and "not a request using a specified method".

The communication path-related cause among the failure cause categories indicates a cause of a failure resulting from a communication path, and communication path-related failure causes include "timeout error".

The receiver-related cause among the failure cause categories indicates a cause of a failure resulting from the receiver side, and receiver-related failure causes include "failure to download image", "image in an unsupported format", and "corrupted image", "server error".

Flow of Process

In the present embodiment, a series of processing steps from when an image is transferred from the imaging apparatus 101 to the image management apparatus 102 to when the image analysis apparatus 103 executes an analysis process and the image management apparatus 102 stores a result of the analysis will be described.

Figure 5A:
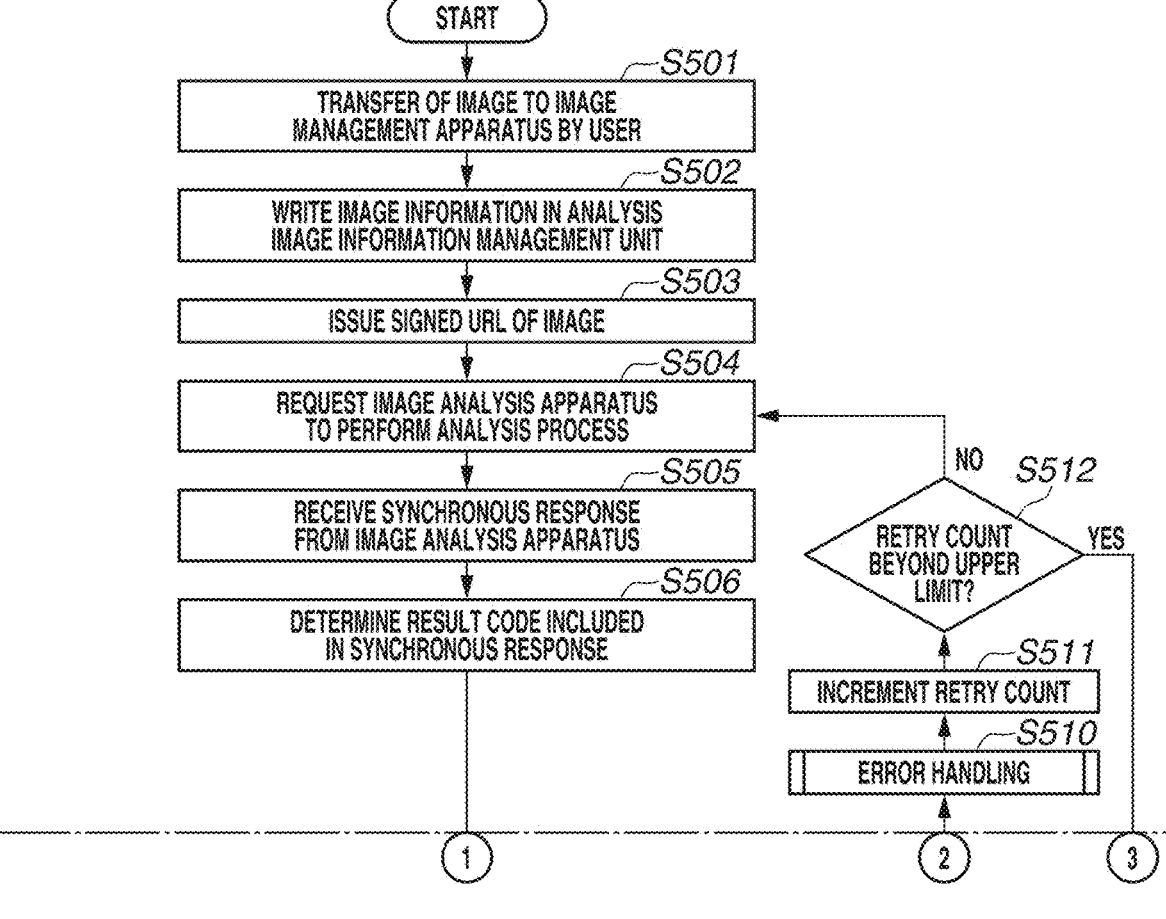
FIGS. 5A and 5B are a flowchart illustrating a process flow from an image transfer process to a process of saving analysis results.
Figure 5B:
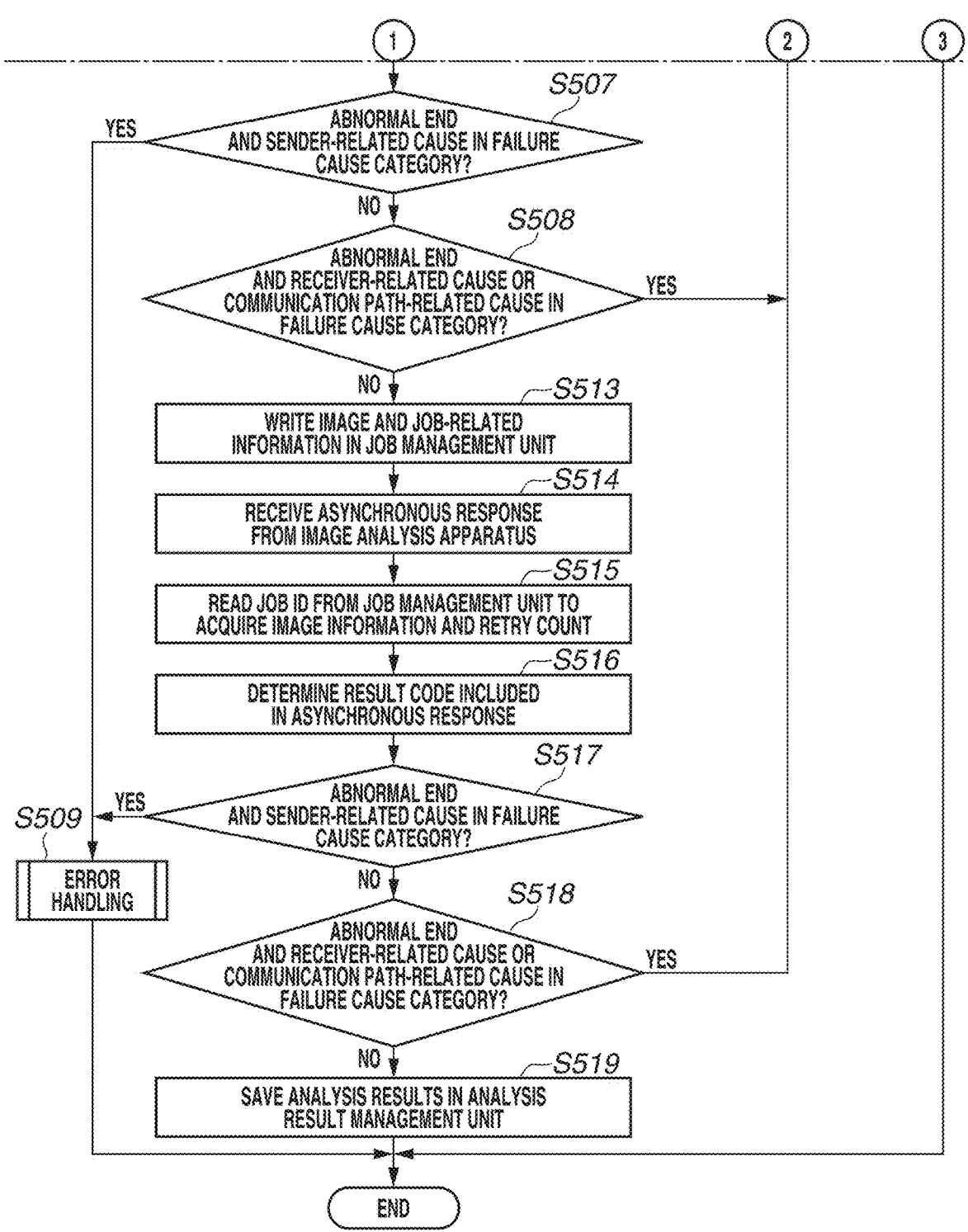

FIGS. 5A and 5B illustrate a flowchart with a series of steps from when an image is transferred from the imaging apparatus 101 to the image management apparatus 102 to when the image analysis apparatus 103 executes an analysis process and the image management apparatus 102 stores a result of the analysis.

In step S501, an image captured by the imaging apparatus 101 is transferred to the image management apparatus 102. The process in this step causes the image to be stored in the image management unit 301. When the image is stored in the image management apparatus 102, the image is assigned an image ID that uniquely identifies the image. The storage of the image starts an image analysis process. In step S502, information on the image to be analyzed is written in the analysis image information management unit 307. FIG. 6 illustrates an example of the information stored in the analysis image information management unit 307.

The information stored includes an image ID 601 of the to be analyzed, a user ID 602 that is an identifier of a user who is the owner of the image, an image storage location 603 that indicates the storage location of the image, and an image analysis start time 604 that is a time when the image analysis is started. The image storage location 603 is, for example, a path on a cloud storage or a path to a storage area in the image management apparatus 102. The image analysis start time 604 is a time when the information is written in the analysis image information management unit 307.

Next, in step S503, a signed uniform resource location (URL) of the image to be analyzed is issued. In the present embodiment, the signed URL of the image is transmitted to the image analysis apparatus 103 as a request parameter for an image analysis request. The image analysis apparatus 103 accesses the URL to download the image. The method of transferring the image is not limited to the above method. Image data may be directly transmitted to the image analysis apparatus 103, or the image may be placed in a storage area accessible by the image analysis apparatus 103.

In step S504, the image analysis apparatus 103 is requested to perform an analysis process. The request includes the signed URL issued in step S503 and a notification destination (end point) that receives a result of the analysis, as request parameters. In the present embodiment, when an analysis process request is made to the image analysis apparatus 103, the image analysis apparatus 103 makes two types of responses: a synchronous response and an asynchronous response that returns a result of analysis after an analysis process is completed. Each response includes a job ID and a result code. FIGS. 7A to 7D illustrate examples of response information from the image analysis apparatus 103. FIGS. 7A to 7D illustrate examples of synchronous responses of "normal end" and "abnormal end" and asynchronous responses of "normal end" and "abnormal end", respectively.

In step S505, a synchronous response is received from the image analysis apparatus 103. Then, in step S506, the result code included in the response is determined. In steps S507 and S508, the result codes in FIG. 4 are referenced to determine whether the image analysis process has been successful (normal end) or has failed (abnormal end). If the image analysis process has failed, a subsequent process is determined based on the failure cause category 404. If the failure cause category is a sender-related cause (YES in step S507), the process proceeds to step S509. If the failure cause category is not a sender-related cause (NO in step S507), the process proceeds to step S508. If the failure cause category is a receiver-related cause or a communication path-related cause (YES in step S508), the process proceeds to step S510. If the failure cause category is not a receiver-related cause or a communication path-related cause (NO in step S508), the process proceeds to step S513.

In the present embodiment, in steps S509 and S510, the image stored in the image management apparatus 102 is temporarily copied to another area in the image management apparatus 102. In investigating an image for which an image analysis process has failed, there is a possibility that the image to be investigated may no longer exist e.g. due to deletion of the image from the image management apparatus 102 by a user, user's withdrawal from membership. In order to enable the investigation of the image for which the analysis has failed even in such a case, if an error occurs in the image analysis process, the image is temporarily copied to another area. At this time, the process content of step S509 and the process content of step S510 may be different. For example, in step S509, a notification of occurrence of an error may be made to an administrator of the image management apparatus 102.

After step S510, a retry process is performed. In the present embodiment, the upper limit of the number of retires (retry count) of an analysis process on each image is set to three. If the analysis process fails after three retries, the analysis process is determined to have "failed". In step S511, the number of retires is incremented by one, and in step S512, it is determined whether the number of retires has exceeded the upper limit of three. If it is determined in step S512 that the upper limit has not been exceeded (NO in step S512), the processing returns to step S504. In step S504, an image analysis request is transmitted to the image analysis apparatus 103 again.

If the analysis process is determined to have been "successful" based on the result code of the synchronization response, then in step S513, the image and job-related information are written to the job management unit 308. FIG. 8 illustrates an example of the information to be stored in the job management unit 308.

The information includes a processing count 803 that indicates the number of times an analysis process has been performed with a combination of job ID 801 and image ID 802. The initial value of the processing count 803 is "1", and the processing count is incremented each time a retry process is performed. When the retry is made three times that is the upper limit, the processing count becomes "4".

After an analysis process request is made in step S504, the image analysis apparatus 103 accesses the received signed URL, downloads the image, and starts an analysis process. Upon completion of the analysis process, the image analysis apparatus 103 transmits a result of the analysis process as an asynchronous response to the result notification destination. In step S514, the image management apparatus 102 receives the asynchronous response from the image analysis apparatus 103. In step S515, the job ID included in the received asynchronous response is read from the job management unit 308 to acquire the image information and the number of retries. In step S516, the result code included in the asynchronous response is determined. As in steps S507 and S508, in steps S517 and S518, the result codes in FIG. 4 are referenced to determine whether the image analysis process has been successful (normal end) or has failed (abnormal end).

If the result code in the asynchronous response is "normal end" and the analysis process has been "successful" (NO in steps S517 and S518), then in step S519, the analysis result is stored in the analysis result management unit 309. The received analysis result includes information illustrated in FIG. 7C.

In the present embodiment, the number of retries (retry count) per image is controlled in the series of steps in the analysis process (steps S504 to S518). For example, it is assumed that an analysis process of an image with image ID of "002" (image ID=002) is started. If the analysis result is determined as "failed" based on the result code in the synchronous response in step S508 and a retry is performed, the number of retires becomes "1" in step S511. If the analysis result is determined as "successful" based on the result code in the synchronous response after steps S504 to S508 (NO in step S508), the process proceeds to step S513. In step S513, the processing count "2" is written to the job management unit 308 (job ID=J003 in FIG. 8). If the analysis result is determined as "failed" based on the result code in the asynchronous response in step S518 and a retry is performed again, the number of reties becomes "2" in step S511. If the analysis result is determined as "successful" based on the result code in the synchronous response again, then in step S513, the process count "3" is written to the job management unit 308 (job ID=J004 in FIG. 8). Similarly, if the analysis result is determined as "failed" based on the result code in the asynchronous response again in step S518 and a retry is performed again, the number of retries becomes "3" in step S511. If the analysis result is determined as "successful" based on the result code in the synchronous response again, in step S513, the process count "4" is written to the job management unit 308 (job ID=J005 in FIG. 8). Finally, if the analysis result is determined as "failed" based on the result code in the asynchronous response again in step S518, the number of retries becomes "4" in step S511. In step S512, if it is determined that the number of retires exceeds the upper limit (YES in step S512), and the analysis process is determined to have "failed".

The above is the flow of the series of processing steps from the transfer of the image from the imaging apparatus 101 to the image management apparatus 102, to the execution of the analysis process by the image analysis apparatus 103 and the storage of the analysis result by the image management apparatus 102.

In the present embodiment, an example in which a request for one analysis process is made to the image analysis apparatus 103. Alternatively, a plurality of calls may be made in a multi-stage manner. In this case, a result code is issued in the same manner for each of results of a first analysis process (for example, an object analysis process) and a second analysis process (for example, a face recognition process), and a subsequent process is determined.

In this manner, in the image management apparatus 102 and the image analysis apparatus 103 according to the present embodiment, the failure cause category is determined based on the result code received together with the result of the image analysis, and the subsequent process is determined. This makes it possible to, in analyzing an image, reduce failures in the analysis process without unnecessary retries.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, and a memory card.

According to the present invention, it is possible to reduce failures in retrying an analysis request in an image management apparatus that communicates with an image analysis apparatus.

While the present invention has been described with reference to embodiments, it is to be understood that the invention is not limited to the disclosed embodiments.

This application claims the benefit of Japanese Patent Application No. 2023-142031, filed Sep. 1, 2023, which is hereby incorporated by reference herein in its entirety.

What is claimed is:

1. An image management apparatus for managing an image, comprising:
  at least one memory storing a program; and
  at least one processor that, upon execution of the stored program, is configured to operate as:
    a transmission unit configured to transmit an image analysis request to an image analysis apparatus for analyzing the image;
    a reception unit configured to receive an analysis result, including a result code, from the image analysis apparatus;
    a processing result determination unit configured to determine a processing result based on the result code; and
    a retry control unit configured to determine whether to retry the image analysis request based on the processing result,
  wherein the retry control unit does not retry the image analysis request in a case where the processing result indicates a failure resulting from a sender side of the image analysis request.

2. The image management apparatus according to claim 1, wherein in a case where the processing result determination unit determines that analysis of the image has failed, the processing result determination unit classifies, based on the result code, a failure of the analysis of the image into one of a failure resulting from the sender side of the image analysis request, a failure resulting from a communication path, and a failure resulting from a receiver side of the image analysis request.

3. The image management apparatus according to claim 2, wherein the retry control unit is arranged to retry the image analysis request in at least one of a case where the failure of the analysis of the image is classified as the failure resulting from the communication path and a case where the failure of the analysis of the image is the failure resulting from the receiver side of the image analysis request.

4. The image management apparatus according to claim 1, wherein in a case where the retry control unit determines not to retry the image analysis request, it is determined, as a subsequent process, to make a notification to an administrator.

5. The image management apparatus according to claim 1, wherein the failure resulting from the sender side of the image analysis request is at least one of no required parameter, an invalid request header, an invalid parameter type, not a valid parameter, and a request not using a specified method.

6. The image management apparatus according to claim 2, wherein the failure resulting from the communication path is a timeout error.

7. The image management apparatus according to claim 2, wherein the failure resulting from the receiver side of the image analysis request is at least one of a failure to download an image, a failure to upload a result, an image in an unsupported format, an image corrupted, and a server error.

8. The image management apparatus according to claim 1, wherein the result code is an identification code of A01-002 and is associated with a failure cause or a failure cause category.

9. The image management apparatus according to claim 1, wherein it is determined, as a subsequent process, to copy the image in a case where the processing result determination unit determines that analysis of the image has failed.

10. A method of controlling an image management apparatus for managing an image, the method comprising:

transmitting an image analysis request to an image analysis apparatus for analyzing an image;

receiving an analysis result, including a result code, from the image analysis apparatus;

determining a processing result based on the result; and determining whether to retry the image analysis request based on the processing result, wherein the image analysis request is not retried in a case where the processing result indicates a failure resulting from a sender side of the image analysis request.

11. A non-transitory storage medium storing a computer program for causing a computer to execute a method, the method comprising:

transmitting an image analysis request to an image analysis apparatus for analyzing an image;

receiving an analysis result, including a result code, from the image analysis apparatus;

determining a processing result based on the result; and determining whether to retry the image analysis request based on the processing result, wherein the image analysis request is not retried in a case where the processing result indicates a failure resulting from a sender side of the image analysis request.

\* \* \* \* \*